United States Patent [19]

Frisbee

[11] 4,366,881
[45] Jan. 4, 1983

[54] FLIP-UP CONTROL CONSOLE

[75] Inventor: Claude M. Frisbee, Bettendorf, Iowa

[73] Assignee: J. I. Case Company, Racine, Wis.

[21] Appl. No.: 215,462

[22] Filed: Dec. 11, 1980

[51] Int. Cl.³ .............................................. B60K 28/00
[52] U.S. Cl. ..................................... 180/271; 180/90;
180/335; 180/336; 192/129 R
[58] Field of Search ................ 180/272, 271, 315, 90,
180/335, 336, 317, 318, 326, 327, 328, 332, 333,
334; 280/748, 751; 192/129 R, 129 A, 129 B

[56] References Cited

U.S. PATENT DOCUMENTS

| | | | |
|---|---|---|---|
| 1,853,950 | 4/1932 | Wing | 180/271 |
| 2,923,559 | 2/1960 | Owens | 280/748 |
| 3,431,995 | 3/1969 | Kiernan | 180/268 |
| 3,448,821 | 6/1969 | McGuire | 180/90 |
| 3,715,002 | 2/1973 | Halls et al. | 180/328 X |
| 3,799,572 | 3/1974 | Hollins | 280/752 |
| 4,008,626 | 2/1977 | Schulte et al. | 180/315 X |
| 4,126,202 | 11/1978 | Hern | 180/90 X |
| 4,158,968 | 6/1979 | Wilson et al. | 180/333 X |
| 4,318,571 | 3/1982 | Vize | 180/286 X |

Primary Examiner—Joseph F. Peters, Jr.
Assistant Examiner—Milton L. Smith

Attorney, Agent, or Firm—Cullen, Sloman, Cantor, Grauer, Scott & Rutherford

[57] ABSTRACT

A tractor control structure is provided including a pivotal flip-up control console that automatically engages a parking brake and shuts off the fuel supply to the engine when the console is moved to a vertical inoperative position. The console is selectively movable to a vertical inoperative position where it is out of the way when the operator is getting onto or out of the operator's seat. Further, the console is movable to a generally horizontal operative position where conventional transmission control handles are easily accessible from the operator's seat. When the console is moved to its vertical inoperative position, a push-pull cable attachment is automatically pushed forward to actuate an on-off valve for shutting off the fuel supply to the engine and thereby making the machine inoperative. A parking brake is also attached to the pivotal console by means of a tension brake cable. As the console is pivoted upwardly, the brake cable is pulled past the pivotal connection for the console into an over center position where the brake cable actuates the parking brake and resiliently holds the console in its vertical inoperative position.

2 Claims, 3 Drawing Figures

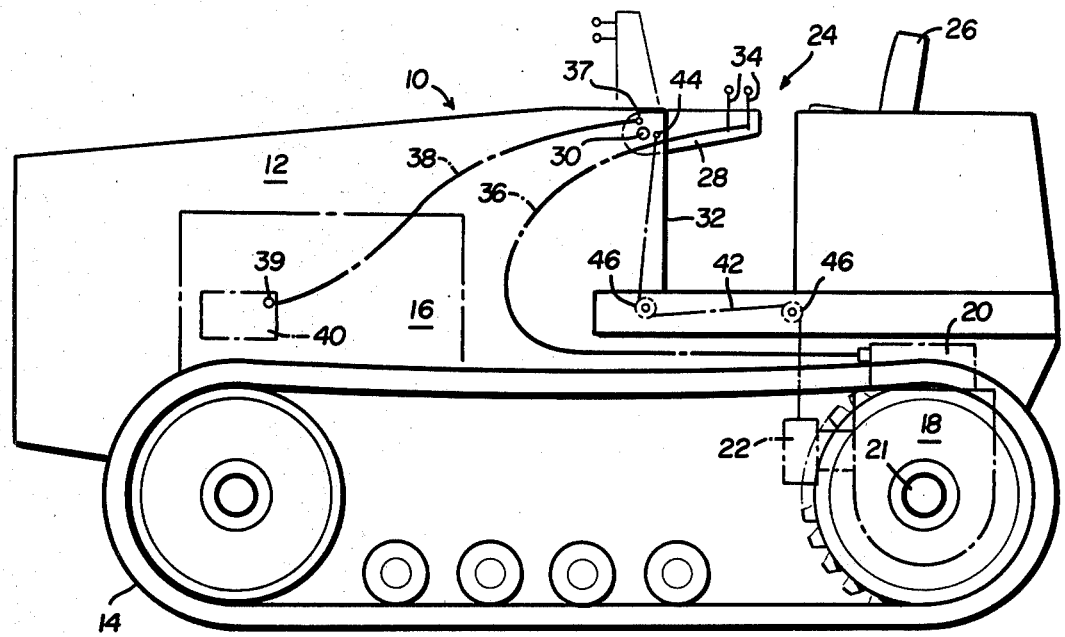
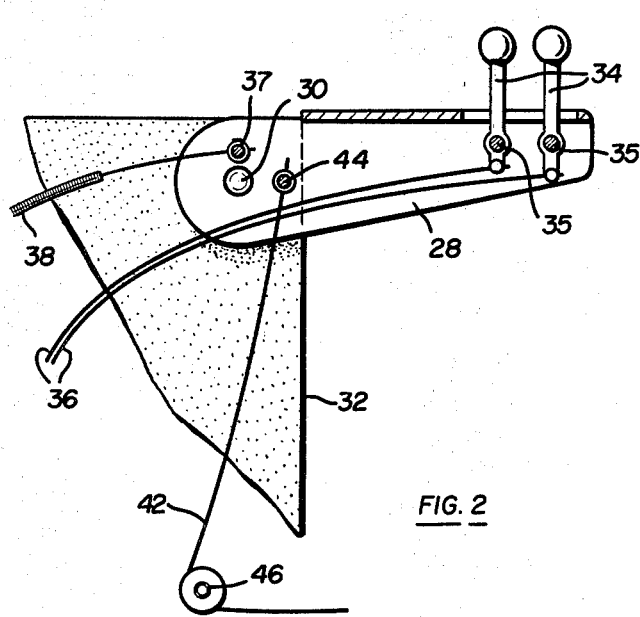
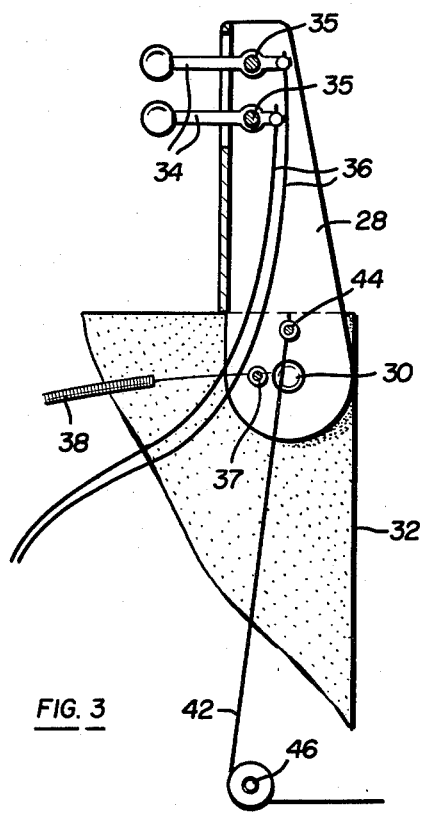

FLIP-UP CONTROL CONSOLE

BACKGROUND OF THE INVENTION

The present invention relates to a tractor control structure, and more particularly, to a pivotal flip-up control console that automatically engages a parking brake and shuts off the fuel supply to the engine when the console is moved to a vertical inoperative position.

It is conventional to provide a series of locking devices for a tractor or the like that are actuated in response to the operative and inoperative modes of the machine. One such device is the dead-man braking system which automatically applies a parking brake whenever the operator leaves his seat. Other devices include starter switches, parking locks, and fuel control mechanisms cooperatively connected to corresponding actuator mechanisms for automatically applying brakes or making the engine incapable of starting when the machine is in a parked position. A problem with known locking devices is that they are quite complex and expensive to manufacture, the complexity and expense mainly being in the means for actuating the locking mechanisms.

A construction machine such as a tractor includes a number of hand operated and foot operated controls which are required for running the machine. Since it is desirable that adequate space be provided at the operator's station so that the operator can easily move onto and off of the operator's seat, a problem arises in adding locking devices, as described, and arranging the various controls and locking devices to make them accessible to the operator. Thus, there has been a need for a tractor control arrangement which both provides the operator adequate room for movement and includes the controls and locking devices necessary for running the machine as well as locking the machine when it is parked.

SUMMARY OF THE INVENTION

The tractor control structure of the present invention includes a flip-up control console that is pivotally attached to the forward end of the operator's compartment. Hand operated transmission control handles are pivotally mounted to the console for actuating the transmission of the tractor by means of a push-pull cable assembly for controlling movement of the machine in a conventional manner. The console is selectively movable to a vertical inoperative position where it is out of the way when the operator is getting onto or out of the operator's seat. Alternatively, the console is movable to a generally horizontal operative position where the control handles are easily accessible from the operator's seat.

The flip-up console actuates several locking devices to make the machine inoperable when it is moved to its vertical out-of-the-way position. The console is attached by a push-pull cable to an on-off valve in the fuel supply apparatus of the engine. When the console is moved to its vertical inoperative position, the cable is automatically pushed forwardly, shutting off the fuel supply to the engine and making the machine inoperative. A second locking device consists of a parking brake that is attached to the pivotal console by means of a tension brake cable. The parking brake is also actuated in response to movement of the console to its inoperative position.

The tension brake cable provides a means of resiliently holding the console in its vertical inoperative position, after it is moved there. The brake cable is attached to the pivotal console at a point that is rearward of the pivotal connection for the console when the console is in its generally horizontal operative position. As the console is pivoted upwardly, the brake cable is pulled past the pivotal connection for the console into an over center position where the brake cable actuates a parking brake and resiliently holds the console in its vertical inoperative position.

Thus, the flip-up control console of the present invention automatically engages a parking brake and shuts off the fuel supply to the engine when the console is moved to its vertical inoperative position. The present construction substantially reduces the complexity and expense involved in providing a means for actuating the locking mechanisms of the machine. Further, adequate space is provided at the operator's station when the console is pivoted out of the way such that the operator can easily move onto and off of the operator's seat. Finally, the flip-up console not only provides the operator adequate room for movement but also includes the controls and locking devices necessary for running the machine as well as locking the machine when it is in a parked position.

Other advantages and meritorious features of the flip-up control console of the present invention will be more fully understood from the following description of the preferred embodiment, the appended claims, and the drawings, a brief description of which follows.

BRIEF DESCRIPTION OF DRAWINGS

FIG. 1 is a side elevational view of a tractor embodying the pivotal flip-up control console of the present invention.

FIG. 2 is a side elevational view of the control console in its horizontal operative position with a portion of the console cut-away for easier viewing.

FIG. 3 is a side elevational view of the control console in its vertical out-of-the-way inoperative position.

DETAILED DESCRIPTION OF THE INVENTION

A preferred embodiment of a tractor including the tractor control structure made in accordance with the teachings of the present invention is illustrated in FIGS. 1-3.

The tractor 10 shown in FIG. 1 is seen to include a main frame 12 flanked by a pair of drive track frames 14. An engine 16, transmission 18, transmission control assembly 20, axle assembly 21, and parking brake assembly 22 are provided, but further details of their construction are unnecessary since they are conventional devices and, by themselves, form no part of the present invention.

One of the objects of the present invention is to provide adequate space at the operator's station 24 so that the operator can move onto and off of the operator's seat 26 with ease. This object is accomplished by the flip-up control console 28 of the present invention that is movable towards and away from the operator's seat 26 such that the machine controls are readily accessible to the operator when he is seated or movable out of the way to provide maximum space for leaving the tractor.

The flip-up control console 28 is pivotally attached by pin 30 to the forward end 32 of the operator's compartment 24. Hand operated transmission control handles 34 are pivotally mounted by pins 35 to console 28 for actuating the transmission control 20 and transmission 18 of the tractor 10 thereby controlling movement of the machine in a conventional manner. Control handles 34 are connected to the transmission control 20 by means of a push-pull cable assembly 36 which passes through the generally hollow interior of console 28 and through the interior of tractor frame 12 to the transmission control 20. Console 28 is selectively movable to a vertical inoperative position (phantom line position of FIG. 1) where it is out of the way when the operator is getting onto or out of the operator's seat 26. Alternatively, console 28 is movable to a generally horizontal operative position (solid line position of FIG. 1) where the control handles 34 are easily accessible from the operator's seat.

The flip-up console 28 actuates several locking devices to make the machine inoperable when it is moved to its vertical out-of-the-way position. A push-pull cable 38 is attached at one end 37 to console 28 and at its other end to a conventional on-off valve 39 (not shown) in the fuel supply apparatus 40 of the engine 16. When the console 28 is moved to its vertical inoperative position, cable 38 is automatically pushed forwardly, thereby shutting off the fuel supply to the engine and making the machine inoperable. A second locking device consists of parking brake assembly 22 that is attached to the pivotal console 28 by means of a resilient brake cable 42. Brake cable 42 is attached to console 28 by pin 44 and tensioned by rollers 46 which are mounted to tractor frame 12. The parking brake 22 is also actuated in response to movement of console 28 to its inoperative position.

Tension brake cable 42 provides a means of resiliently holding console 28 in its vertical inoperative position, after it is moved there. Referring to FIG. 2, the pin connection 44 between brake cable 42 and console 28 is rearward of the pivotal connection 30 for the console 28 is in its generally horizontal operative position. As console 28 is pivoted upwardly, as illustrated in FIG. 3, brake cable 42 is pulled past the pivotal connection 30 for the console into an over center position where brake cable 42 actuates parking brake 22 and resiliently holds console 28 in its vertical inoperative position.

Thus, flip-up control console 28 automatically engages parking brake 22 and shuts off the fuel supply to the engine when the console is moved to its vertical inoperative position. Console 28 also provides a means for making the control handles 34 readily accessible to the operator when he is seated or movable out of the way to provide maximum space when the operator leaves the tractor. Further, control console 28 substantially reduces the complexity and expense involved in providing a means for actuating the fuel supply cut-off valve 39 and parking brake 22.

It will be apparent to those skilled in the art that the foregoing disclosure is exemplary in nature rather than limiting, the invention being limited only by the appended claims.

I claim:

1. In a tractor having a frame, an engine mounted on said frame, said engine including a fuel supply apparatus, a forward-reverse transmission drivingly interconnected between the engine and an axle means, a parking brake mechanism associated with said tractor, and an operator's station on said frame, said operator's station including an operator's seat, the improvement comprising:

a flip-up control console for automatically engaging said parking brake mechanism and shutting off the fuel supply to the tractor engine when the console is moved to an inoperative position, said console being pivotally connected to the forward end of said operator's station, control handles pivotally connected to said console and connected to said transmission by means of a push-pull cable assembly for controlling movement of the tractor, said console being movable to a generally vertical inoperative position where it is out of the way when the operator is getting onto or out of the operator's seat and said console being movable to a generally horizontal position where the control handles are easily accessible from the operator's seat;

said console being connected to a locking means in said fuel supply apparatus for the engine whereby said locking means shuts off fuel supply to the engine and makes the tractor inoperative in response to said console being moved to its inoperative position; and means for connecting said console to said parking brake mechanism such that said parking brake is also actuated in response to pivotal movement of said console to its inoperative position.

2. The tractor as defined in claim 1 wherein said parking brake connecting means includes a tension brake cable attached to the pivotal console at a point that is rearward of the pivotal connection for the console when the console is in its generally horizontal position, said brake cable being pulled past the pivotal connection for the console into an over center position in response to pivotal movement of said console to its inoperative position whereby said brake cable actuates said parking brake mechanism and resiliently holds said console in its operative position.

* * * * *